United States Patent
Lloyd et al.

[15] 3,696,133
[45] Oct. 3, 1972

[54] EXTRACTION OF OIL FROM OIL-BEARING MATERIALS

[72] Inventors: Anthony Michael Lloyd, Walkington; David George Alexander, Kirkella, both of England

[73] Assignee: Rose Downs & Thompson Limited, Kingston-upon-Hull, Yorkshire, England

[22] Filed: April 13, 1970

[21] Appl. No.: 28,149

[52] U.S. Cl. ............................................. 260/412.8
[51] Int. Cl. .............................................. C11b 1/10
[58] Field of Search ................................... 260/412.8

[56] References Cited

UNITED STATES PATENTS 2,726,253  12/1955  Gastrock et al. ........260/412.8
2,781,336  2/1957   Zenczak ..................260/412.8
3,113,954  12/1963  Upton .....................260/412.8

*Primary Examiner*—Lewis Gotts
*Assistant Examiner*—Johnnie R. Brown
*Attorney*—Holcombe, Wetherill & Brisebois

[57] ABSTRACT

The invention relates to the extraction of oil from seeds and other oil-bearing materials. The oil-bearing material is first treated with a polar solvent such as isopropyl alcohol in aqueous solution and then a second solvent which has a lower polarity and which may be hexane is passed through the once-treated material. The treatment with the first solvent facilitates the passage of the second solvent through the material and hence the extraction of the oil from the material. Water may be added to the extract recovered from the treatment with the second solvent, to aid separation of the oil from other constituents of the material.

16 Claims, No Drawings

EXTRACTION OF OIL FROM OIL-BEARING MATERIALS

This invention relates to the extraction of oil from oil bearing materials, particularly of animal or vegetable derivation.

Oil bearing vegetable seeds normally consist of oil, water, protein carbohydrates and fiber. Animal material is largely oil, protein, water and minor amounts of carbohydrates.

In conventional processing, the oil is removed by cooking the animal or vegetable material and then extracting the oil by applying pressure or by the use of solvents. The material from which the oil has been removed is known as meal and is commercially valuable, chiefly as an animal food stuff. The value of the meal as food stuff is, in many cases, limited by the presence of small amounts of toxic impurities, for example gossypol in cottonseed, aflatoxin in groundnut meal and trypsin inhibitor in soya bean meal. The toxic nature of these impurities is reduced by cooking the seed, often in the presence of added moisture. Cooking also aids the subsequent extraction of the oil in conventional processes but unfortunately renders the valuable protein in the meal less readily digestable when used as a food stuff.

Various proposals have been made to produce an improved quality of meal by extracting the raw material or the meal with a variety of solvents, or solvent mixtures. It has been proposed in British Pat. specification No. 905607 for example to solvent extract material containing oil or fats with at least 20 percent water, by the use of a water miscible solvent or solvent mixture and possibly a further solvent which may be miscible or immiscible with the first solvent. The material is treated with a mixture of the water-miscible solvent and water to remove the undesirable constituents; then the resulting solids are treated with comparatively water free solvent, which may be the same as the first solvent used, or may be another solvent which is miscible or immiscible with the first solvent. The extract, after separation from the meal, is fed back to the previous stage until it reaches the first stage from which the extraction liquor is removed. The extraction liquor is then allowed to separate into two phases, one phase containing substantially all the water and the other phase substantially all the fat.

In practice, this separation of the two liquid layers can be difficult to carry out. For effective separation the specific gravities of the layers of water containing solvent and oil containing solvent must be appreciably different, and this imposes limitations on the process, in particular in the choice of solvents. The separation of the two layers may be further complicated by the occurrence of emulsifying agents in the extract. When solvent mixtures are employed on a commercial scale the task of recovering the solvents from the meal, the oil, and from the waste water and then removing the dissolved water from the recovered solvent can be costly. Furthermore, the process disclosed in British Pat. specification No. 905607 has the disadvantage that a mechanical separator is required for each stage of the process, since in each stage the solvent and the solid material must move co-currently; also, the mechanical separation of oil seeds from the water containing solvents is difficult. The liquid is retained tenaciously and, in the screw press type of machine described in the specification, excessive amounts of fine material are produced in the press liquors, giving rise to a third semi-solid layer to be separated from the two liquid layers mentioned in the specification.

The present invention resides in a process for the extraction of oil from oil-bearing materials, in which the material is first treated with a solution in water of a polar solvent which is at least partially miscible with water, and the once treated material is extracted with a second solvent of lower polarity in which the oil is soluble but which is substantially immiscible with water, an extract being obtained which is predominantly the second solvent and contains oil, but which also contains an amount of the polar solvent water and undesirable constituents. Preferably the extract is treated by adding water, when much of the polar solvent, water and undesirable matter separate as an aqueous layer which can be removed from the oil-containing layer.

The polar solvent may be added in an amount such that all is absorbed by the oil-bearing material. It is however preferred to use sufficient of polar solvent and water to give a separate extract which is separated from the material, thus removing some of the undesirable constituents, before the material, together with such of the first solvent that is absorbed, passes to the extraction stage using the second solvent.

It is known that if uncooked comminuted oil seed is treated with a non-polar solvent and agitated vigorously, the oil is extracted and it is very difficult to separate the finely divided extracted seed from the oil containing solvent.

Surprisingly, we have found that, if the material is treated first with a polar solvent and then with a non-polar solvent the material becomes particulate and separation from the solvents is easier. The polar solvent required may be used to give a preliminary extraction, in which case, a first extract containing non-oil impurities is removed, or may be used in such quantity that it is all absorbed by the seed, which is then extracted with the non-polar second solvent. The increased ease with which the solvent separates from the seed in the main extraction is such that in favorable cases the extraction with the second solvent may be carried out in a rotary solvent percolation extraction equipment known as a Rotocel, as described in U.S. Pat. No. 2840459.

Instead of a Rotocel, which is a multistage percolation extractor, it is preferred that extraction shall be carried out in a device where the solvent and solid material move continuously counter current to one another, separation of the solid and liquid being by gravitational means, so making it possible to obtain multiple extraction stages without the expense of using filters and centrifuges between each extraction stage. This is particularly desirable in the case of mixtures of solvents with solids which are compressible and therefore not readily separated from liquids by conventional means.

The first polar solvent may be used in such small amounts as to be all absorbed by the oil bearing material, which then passes into the extractor where it is treated in counter current flow with the non-polar second solvent; alternatively, the first polar solvent may be used in larger quantity in a first extractor where the solvent moves counter current to the flow of material so giving a multi-stage extraction with the first solvent. An extract is recovered from the first extractor and the solid from the first extractor is separated from the freely draining first solvent before passing to a second extractor where it is treated in counter current flow with the second non-polar solvent which extracts the oil in a multi-stage extraction process.

It is preferred to employ for the treatment with the non-polar solvent, or for each extraction in the case where counter-current flow is employed in both stages, a mixer separator as described for example in British Pat. specification No. 1184345. The oil-bearing material in the latter case is thus first continuously treated in a first mixer separator in which the material and the aqueous polar solvent pass counter-current, and thereafter the material from that mixer separator is continuously fed to, and treated in, a second mixer separator in which the once-treated material with absorbed aqueous polar solution is passed counter-current with the second solvent.

After the second extraction the second non-polar solvent together with the dissolved oil contains a small amount of the first polar solvent together with non-oil impurities. A preliminary purification of this oil-containing solution is achieved by agitating the mixture with a small amount of water; the mixture then readily separates into two layers, a non-polar solvent layer containing the oil in solution and a polar solvent layer containing the water and impurities carried into the oil with the first solvent. The same separation is achieved without the addition of water, if the first solvent already contains much water. The meal from the second extraction contains solvent, but this is nearly all the second non-polar solvent, the first polar solvent having been removed by the second extraction process. This second solvent being non-polar is weakly absorbed by the meal and so desolventisation is comparatively easy.

The first or polar solvent can be an alcohol or ketone, the preferred solvent being a mixture of isopropyl alcohol and water corresponding more or less to the azeotrope recovered by distillation of a mixture of water and isopropyl alcohol. The second non-polar solvent may be an hydrocarbon or chlorinated hydrocarbon and is preferably a commercially available petroleum fraction which is low in aromatic hydrocarbon content and which consists largely of hexane or heptane.

This combination of solvents offers considerable advantages. Both solvents are relatively cheap and non-toxic and are, therefore, safe to use in the processing of food stuffs. A further advantage is that the mixture of hexane, isopropyl alcohol and water forms a ternary azeotrope with a lower boiling point than any of its constituents: desolventisation of the meal is thus aided. In the presence of steam the ternary azeotrope is vaporized for so long as both hexane and isopropyl alcohol are present together in the meal. When all the isopropyl alcohol has been removed in this way, then any residual hexane may be evaporated at its boiling point, as is well known in the art.

EXAMPLE

A sample of very old cottonseed which had deteriorated badly in storage was rolled to break down the cellular structure and extracted. The extractor was a vertical glass column fitted with an axial shaft rotating at 145 r.p.m. and having agitators at 6 inch centers. The solvent used for extraction passed up the column through the seed bed and was then recirculated to the base of the column via a pump and a heat exchanger. After 20 minutes extraction the solvent was run off from the base of the column until the stream of drained miscella slowed to a negligible flow rate. More solvent was then added (Run 2) and the extraction procedure repeated.

Test 1.

In this test, the seed was wetted with its own weight of isopropyl alcohol containing 13 percent water, all the solvent being absorbed by the seed, allowed to stand for 20 minutes and extracted as described above four times with hexane at 50° C. The following are the amounts of liquid recovered on each run expressed as a percentage of the amount of hexane added in the run.

|  | % Recovery |
|---|---|
| Run 1 | 90 |
| Run 2 | 123 |
| Run 3 | 103 |
| Run 4 | 108 |

The percentage recovered in Runs 2 to 4 exceed 100 percent because of the dissolved oil and the isopropyl alcohol extracted.

Test 2.

The seed was first extracted four times with isopropyl alcohol containing 13 percent water, and then four times with hexane. In this test, the amount of isopropyl alcohol and water used in Run 1 was greater than that used in subsequent extractions by an amount equal to the weight of the seed which was assumed to be the amount absorbed by the seed. In the following results, this added amount is omitted in the calculations:

|  |  | % Recovery (isopropyl alcohol) |
|---|---|---|
| Run | 1 | 83 |
|  | 2 | 102 |
|  | 3 | 75 |
|  | 4 | 118 |
|  |  | % Recovery (hexane) |
| Run | 5 | 123 |
|  | 6 | 107 |
|  | 7 | 95 |
|  | 8 | 107 |

Test 3.

To give a comparison, the seed was extracted at 50° C with hexane alone, i.e. without a prior treatment with isopropyl alcohol. As before, the solvent used in Run 1 was increased by the weight of seed, the added amount being disregarded for the calculation of recovery

|  | % Recovery |
|---|---|
| Run 1 | 55 |
| 2 | 98 |
| 3 | 86 |
| 4 | 95 |

These recovery values show very clearly that whereas the hexane-treated seed in Test 3 drained badly, much of the solvent being retained by the seed, addition of polar solvent prior to hexane extraction gave a granular seed mass which drained well in Tests 1 and 2. Oil extraction was substantially complete in each case, but in Test 2 considerable amounts of gums and sugars were removed with the isopropyl alcohol to give a lighter colored meal. This is illustrated by the following data on the oil recovered by evaporating the hexane solutions, the data illustrating also the poor quality of the oil resulting from the degraded state of the seed:

|  | Test 3 | Test 1 | Test 2 |
|---|---|---|---|
| Free fatty acid % | 9.9 | 9.9 | 3.5 |
| Colour (Lovibond) ⅛" cell) | Too dark to measure | 16Y 21R | Too dark to measure |

A modified Wesson Loss procedure illustrates the improvement in oil quality which the refining could give

|  | Test 3 | Test 1 | Test 2 |
|---|---|---|---|
| Refining loss | 15% | 21% | 6% |
| Colour of refined oil (⅛" Lovibond cell) | 30Y 17R | 12Y 1.5R | 0.7Y 0.7R |

These results show that by suitable choice of extraction procedure using first a polar solvent for example isopropyl alcohol containing water and secondly a non-polar solvent for example commercial hexane, the percolation extraction of uncooked seed may be facilitated and the oil so obtained may be refined to a better standard than is obtained when using simple extraction with commercial hexane.

In Tests 1 and 2, the hexane extract is subsequently treated by the addition of water, when the extract settles into two layers - a hexane layer containing the extracted oil and an aqueous layer containing polar solvent and undesirable constituents of the seed. The separated hexane layer is then treated for solvent recovery and further oil purification.

We claim:

1. In a process for the extraction of oil from an oil-bearing vegetable material in which said material is treated with an aqueous solution of a polar solvent which is at least partially miscible with water; the improvement comprising the following steps of
    a. extracting the treated material containing at least some of said polar solvent with a second solvent which is of lower polarity than said polar solvent, in which the oil is soluble, and which is substantially immiscible with water;
    b. thereby obtaining an extract of the oil dissolved in said second solvent, which extract is free of said vegetable material but which also contains an amount of said polar solvent and water;
    c. separating out said second solvent and dissolved oil; and
    d. recovering the oil from the solution of said second solvent.

2. In a process for the extraction of oil from an oil-bearing vegetable material in which the material is treated with an aqueous solution of a polar solvent which is at least partially miscible with water; the improvement comprising the further steps of
    a. extracting the treated material containing at least some of the polar solvent with a second solvent which is of lower polarity than said polar solvent, in which the oil is soluble, and which is substantially immiscible with water;
    b. thereby obtaining an extract of the oil dissolved in said second solvent which extract is free of said vegetable material but which also contains an amount of said polar solvent, water and undesirable constituents of said vegetable material;
    c. if necessary, adding further water to said extract;
    d. allowing said extract to separate into two layers of which a first contains said second solvent and dissolved oil and a second contains said polar solvent, water, and said undesirable constituents;
    e. separating said first layer; and
    f. recovering the oil from said first layer.

3. A process for the extraction of oil according to claim 2 in which all the polar solvent added is absorbed by the oil-bearing material, there being no percolation.

4. A process for the extraction of oil according to claim 1 in which the polar solvent is caused to percolate through the material to extract undesirable constituents prior to extraction of the material with the second solvent.

5. A process for the extraction of oil according to claim 1 in which the polar solvent is an alcohol or a ketone.

6. A process for the extraction of oil according to claim 5 in which the polar solvent is isopropyl alcohol.

7. A process for the extraction of oil according to claim 6 in which the polar solvent is the azeotrope recovered by the distillation of a mixture of water and isopropyl alcohol.

8. A process for the extraction of oil according to claim 1 in which the second solvent is an hydrocarbon or chlorinated hydrocarbon.

9. A process for the extraction of oil according to claim 8 in which the second solvent is a commercially available petroleum fraction which is low in aromatic hydrocarbon content.

10. A process for the extraction of oil according to claim 9 in which the second solvent is hexane.

11. A process for the extraction of oil according to claim 1 in which the material after treatment with the polar solvent is treated in counter-current flow with the second solvent.

12. A process for the extraction of oil according to claim 11 in which the treatment with the second solvent is effected is a plurality of counter-flow stages.

13. A process for the extraction of oil according to claim 11 in which the extraction with at least the second solvent is performed continuously in a mixer separator.

14. A process for the extraction of oil according to claim 11 in which the material is first continuously treated with the polar solvent in a first mixer separator in which the material and the aqueous polar solvent pass counter-current, and thereafter the material from that first mixer separator is continuously fed to, and treated in, a second mixer separator in which the once-treated material with absorbed aqueous polar solution is passed counter-current with the second solvent.

15. Process as claimed in claim 1 in which said vegetable material is a seed material.

16. Process as claimed in claim 15 in which said polar solvent is a mixture of water and at least one material selected from the group consisting of alcohols and ketones.

* * * * *